(12) United States Patent
Griffin et al.

(10) Patent No.: US 7,363,764 B2
(45) Date of Patent: Apr. 29, 2008

(54) GAS TURBINE POWER PLANT AND METHOD OF OPERATING THE SAME

(75) Inventors: Timothy Griffin, Ennetbaden (CH); Daniel Holmberg, Norrköping (SE); Dieter Winkler, Lauchringen (DE)

(73) Assignee: ALSTOM Technology Ltd, Baden (CH)

( * ) Notice: Subject to any disclaimer, the term of this patent is extended or adjusted under 35 U.S.C. 154(b) by 525 days.

(21) Appl. No.: 11/123,128

(22) Filed: May 6, 2005

(65) Prior Publication Data

US 2005/0235650 A1  Oct. 27, 2005

Related U.S. Application Data

(63) Continuation of application No. PCT/EP03/50782, filed on Nov. 3, 2003.

(60) Provisional application No. 60/424,681, filed on Nov. 8, 2002.

(30) Foreign Application Priority Data

Nov. 19, 2002 (EP) .................. 02405995

(51) Int. Cl.
*F02C 3/20* (2006.01)

(52) U.S. Cl. .................. 60/780; 60/39.12; 60/723; 60/783

(58) Field of Classification Search .............. 60/39.12, 60/39.52, 723, 772, 777, 780, 783
See application file for complete search history.

(56) References Cited

U.S. PATENT DOCUMENTS

| 4,999,995 | A | | 3/1991 | Nurse .................. 60/39.12 |
| 5,865,878 | A | * | 2/1999 | Drnevich et al. .............. 95/54 |
| 6,269,624 | B1 | | 8/2001 | Frutschi et al. ............ 60/39.02 |
| 6,767,527 | B1 | * | 7/2004 | Asen et al. .............. 423/437.1 |
| 2001/0042367 | A1 | | 11/2001 | Frutschi et al. ............ 60/39.02 |
| 2002/0127177 | A1 | | 9/2002 | Gottzmann et al. ......... 423/650 |

FOREIGN PATENT DOCUMENTS

| EP | 0 939 199 A1 | 9/1999 |
| EP | 0 953 748 A1 | 11/1999 |
| GB | 2 296 255 A | 6/1996 |

* cited by examiner

*Primary Examiner*—L. J. Casaregola
(74) *Attorney, Agent, or Firm*—Steptoe & Johnson LLP

(57) ABSTRACT

A method of operating a gas turbine power plant and gas turbine power plant are disclosed wherein hydrogen for the combusting process is produced by feeding natural gas mixed with steam through a membrane/partial oxidation reactor and converting the natural gas at least to $H_2$ and CO. Thereby oxygen is transferred from the compressed air through the membrane of the membrane/partial oxidation reactor and the oxygen is used for the partial oxidation process of the natural gas. The process is followed by converting the syngas in a CO shift reactor and a CO shift reactor to a $CO_2$ removal equipment to mainly hydrogen.

20 Claims, 2 Drawing Sheets

US 7,363,764 B2

GAS TURBINE POWER PLANT AND METHOD OF OPERATING THE SAME

CROSS-REFERENCE TO RELATED APPLICATIONS

This application is a continuation of the U.S. National Stage designation of co-pending International Patent Application PCT/EP2003/050782 filed Nov. 3, 2003, which claims priority to U.S. provisional application No. 60/424,681 filed Nov. 8, 2002 and European patent application no. 02405995.8 filed Nov. 19, 2002, and the entire contents of these applications are expressly incorporated herein by reference thereto.

FIELD OF THE INVENTION

The invention relates to a method of operating a gas turbine power plant and a gas turbine power plant.

BACKGROUND OF THE INVENTION

In the last years different projects were launched with the aim to develop emission free gas turbine based processes using semi-closed cycles with $CO_2/H_2O$ mixtures as working fluid. Methods of operating such power plants are known for example from EP-A1-0 939 199 and EP-A1-0 953 748. In these processes the fuel, usually natural gas, reacts with technically pure oxygen generated either in an external air-separation unit or internally in an integrated membrane reactor. One major disadvantage of using air-separation units for these kind of processes is that they consume a great amount of energy, thus penalizing the efficiency and power output of the plant. From the literature it can be found that the energy demand for air-separation units is as high as 0.3 kWh/kg $O_2$ produced. The energy consumption for separating the oxygen from the air can be decreased very much if oxygen-separating membranes are used. Also this technique has a few disadvantages, namely: metal to ceramic sealing is needed that can withstand temperatures >800° C., the turbine inlet temperature (TIT) and the ceramic sealing temperature are linked, which limits the maximum TIT and thus lowers the performance of the plant and one needs to separate large amounts of air, corresponding to the total $O_2$ required for full oxidation of fossil fuel powering the gas turbine.

SUMMARY OF THE INVENTION

The present invention relates to providing a method of operating a gas turbine power plant and a gas turbine power plant which avoid disadvantages of the prior as well as increasing the overall efficiency of the power plant.

This present invention is related to making use of so-called partial oxidation (POX) of the natural gas to syngas consisting of CO and $H_2$. The oxygen required for this partial oxidation is provided by a ceramic, air separation membrane, thermally integrated into the process. This syngas would then be water gas shifted to produce even more hydrogen and convert the CO to $CO_2$, and finally use the produced hydrogen as fuel in a gas turbine.

By doing this, one would overcome the temperature limit previously set by the membrane. The membrane reactor unit would be combined to both work as an oxygen transferring membrane and as a reactor for the partial oxidation. One membrane type that can be used to separate the oxygen from the air is a so-called "Mixed Conducting Membrane" (MCM). These materials consist of complex crystalline structures, which incorporate oxygen ion vacancies (5-15%). The transport principle for oxygen transport through the membrane is adsorption on the surface followed by decomposition into ions, which are transported through the membrane by sequentially occupying oxygen ion vacancies. The ion transport is counterbalanced by a flow of electrons in the opposite direction completing the circuit. The driving force is a difference in oxygen partial pressure between the permeate and retentate sides of the membrane. The transport process also requires high temperatures, i.e. >700° C. In an embodiment of the present invention the surfaces of the permeate side of the membrane that contain the syngas are coated with catalytic material to promote the formation of synthesis gas $17_1$ and, in particular, hydrogen. Catalyst materials used for autothermal reforming are Rh, Ru, Co, Fe or bimetallic combinations thereof.

Optionally, prior to entering the membrane reactor, the air stream from the compressor can be lead to a catalytic burner where the air is heated by means of catalytic combustion. The fuel for the catalyst is either hydrogen or natural gas. Thereby the use of hydrogen is preferred to avoid producing $CO_2$. The reason for using a catalytic burner is to increase the average temperature in the membrane/POX reactor thereby increasing the oxygen flux through the membrane. Also, the temperature gradient in the reactor will be lower and thus the thermal stresses for the reactor will decrease.

Advantageously the syngas coming from the membrane/POX reactor consisting of hot steam, $H_2$ and CO can enter a low temperature heat exchanger, where the syngas mixture is cooled down by an incoming stream of the compressed air from the compressor. Another possibility would be to use a medium temperature heat exchanger to raise the temperature of the mixture of steam and natural gas before the mixture enters the membrane/POX reactor. This would flatten out the temperature profile in the membrane/POX reactor and thus lower the temperature gradients in this.

After the expansion the hot flue gases of the gas turbine can be utilised in a heat recovery steam generator producing steam for the bottoming steam cycle and producing more power in a steam turbine and electricity in a generator.

BRIEF DESCRIPTION OF THE DRAWINGS

Preferred embodiments of the invention are illustrated in the accompanying drawings, in which.

The drawings show only the parts important for the invention. Same elements will be numbered in the same way in different drawings.

DETAILED DESCRIPTION OF THE PREFERRED EMBODIMENTS

Figure 1:
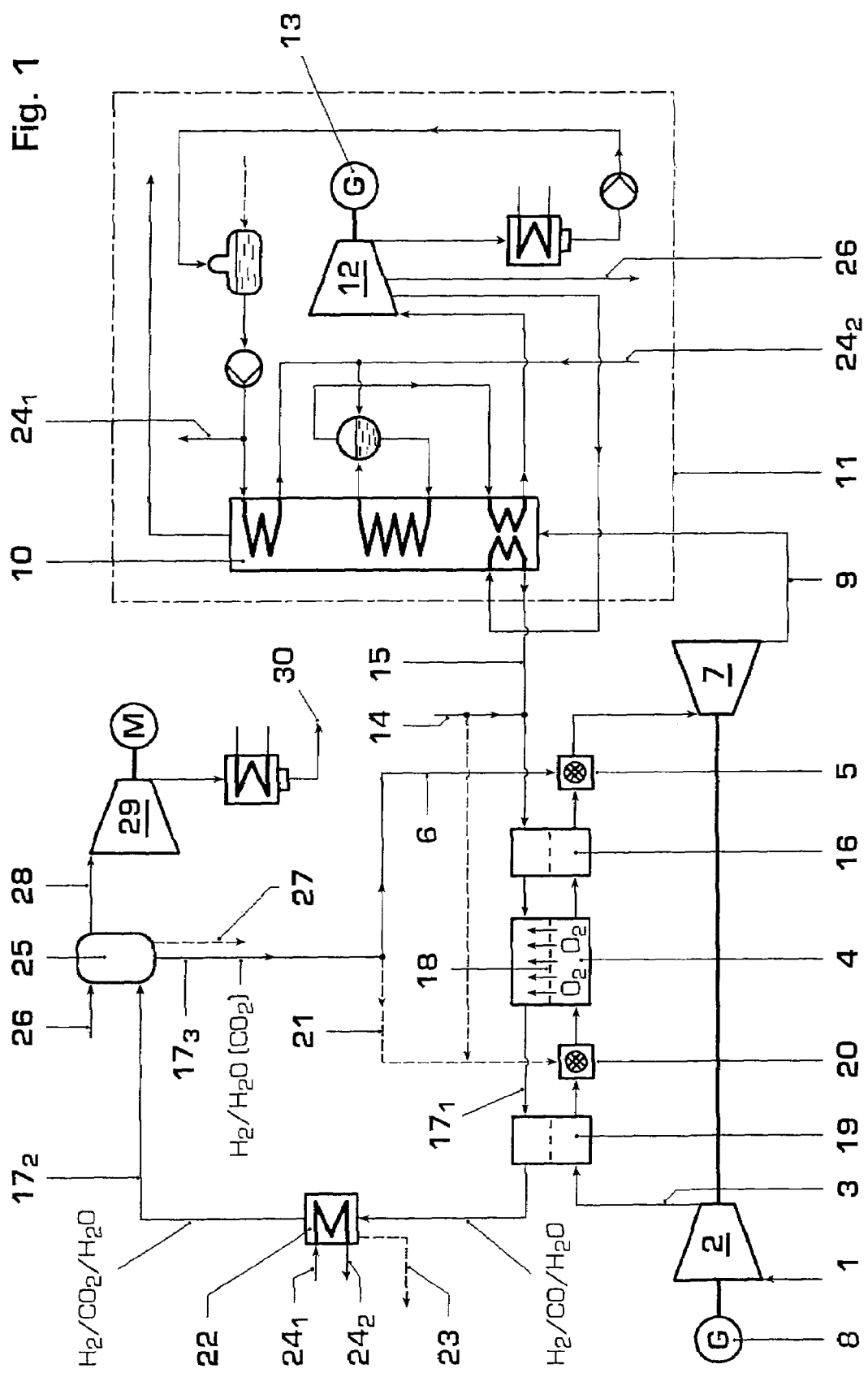
FIG. 1 illustrates a gas turbine power plant according to the present invention.

FIG. 1 shows a syngas based low emission power plant according to the present invention. Air 1 is fed through a compressor 2 before the compressed air 3 is fed at least through a membrane/partial oxidation (POX) reactor 4. After the membrane/POX reactor 4 the air is burned in a combustion chamber 5 together with hydrogen 6. The flue gases are then expanded in a turbine 7, which is driving the compressor 2 and producing electricity in a generator 8. After the expansion the hot flue gases 9 are utilised in a heat recovery steam generator 10 producing steam for the bottoming steam cycle 11 and producing more power in a steam turbine 12 and electricity in a generator 13.

As can be seen from FIG. 1, natural gas 14 is being mixed with superheated intermediate pressure steam 15 and is then lead to the membrane/POX reactor 4. One possibility here would be to use a medium temperature heat exchanger 16 to raise the temperature of the mixture of steam 15 and natural gas 14. This would flatten out the temperature profile in the membrane/POX reactor 4 and thus lower the temperature gradients in this. Since the temperature involved is not too high (<900° C.), it might be possible to use a metal heat exchanger.

Figure 2:
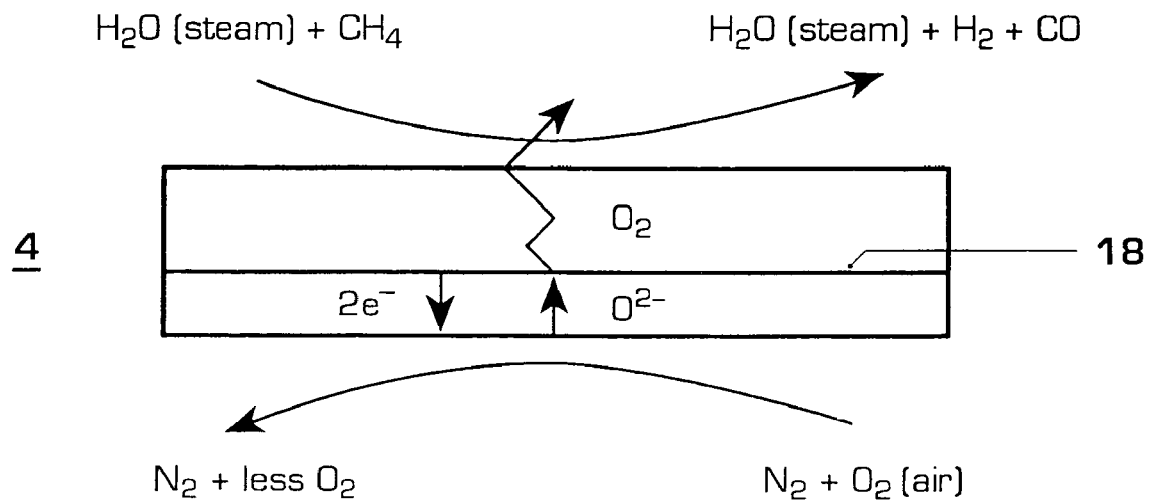
FIG. 2 illustrates the partial oxidation of the membrane/partial oxidation reactor.

As seen in FIG. 2, in the membrane/POX reactor 4, oxygen is transferred through a membrane 18 from a first side to a second side and is partially oxidised (as well as reformed with steam) on the membrane 18 surface with the natural gas 14 by the following reactions:

$$CH_4 + 0.5O_2 \Rightarrow 2H_2 + CO + 35.67 \text{ kJ/mol}$$

$$CH_4 + H_2O \Rightarrow CO + 3H_2 - 205 \text{ kJ/mol}$$

$$CO + H_2O \Rightarrow CO_2 + H_2 + 41.15 \text{ kJ/mol}$$

In sum, the three reactions combine to produce a mixture of $H_2$, CO and $CO_2$; the overall heat balance and product mixture is dictated by the amount of oxygen (and endothermic reactions) that is present. The design of the membrane/POX reactor 4 is such that the overall process is autothermal, and the membrane temperature is of ca. 800° C. The membrane/POX reactor 4 would be combined to both work as an oxygen transferring membrane and as well as doing the partial oxidation. One membrane type that can be used to separate the oxygen from the air is a so-called "Mixed Conducting Membrane" (MCM). These materials consist of complex crystalline structures, which incorporate oxygen ion vacancies (5-15%). The transport principle for oxygen transport through the membrane 18 is adsorption on the surface followed by decomposition into ions, which are transported through the membrane by sequentially occupying oxygen ion vacancies. The ion transport is counterbalanced by a flow of electrons in the opposite direction. The driving force is a difference in oxygen partial pressure between the permeate and retentate sides of the membrane 18. The transport process also requires high temperatures, i.e. >700° C. In an embodiment of the present invention the surfaces of the permeate side of the membrane 18 (that containing the syngas $17_1$) is coated with catalytic material to promote the formation of synthesis gas $17_1$ and, in particular, hydrogen. Catalyst materials used for autothermal reforming are Rh, Ru, Co, Fe or bimetallic combinations thereof (e.g. Co/Fe).

The syngas $17_1$, now consisting of hot steam, $H_2$ and CO enters a low temperature heat exchanger 19, where the syngas $17_1$ mixture is cooled down by an incoming stream of the compressed air 3 from the compressor 2. Optionally, the air stream from the low temperature heat exchanger 19 can then be lead to a catalytic burner 20 where the air is heated by means of catalytic combustion. The fuel for the catalytic burner 20 is either hydrogen 21 or natural gas 14. Use of hydrogen 21 is preferred to avoid producing $CO_2$. The reason for using a catalytic burner 20 is to increase the average temperature in the membrane/POX reactor 4, increasing the oxygen flux through the membrane 18. Also, the temperature gradient in the reactor 4 will be lower and thus the thermal stresses for the reactor 4 will decrease. This catalytic burner 20 can also be used to help control process conditions within the MCM reactor during start up or to address instabilities within the membrane/POX reactor 4 associated with the autothermal reforming and potential catalyst deactivation. The temperature of the MCM reactor will be very sensitive to the amount of $O_2$ present and there could be some strange transients during start up. A quick reacting catalytic burner 4 running on $H_2$ could help for process control.

After the syngas $17_1$ has been cooled down in the low temperature heat exchanger 19, the syngas $17_1$ is then further cooled down in a CO shift reactor 22, lowering the temperature further to about 200-300° C. Depending on the chosen cooling temperature, water will condense out or not. Since a low temperature favors the CO shift reaction it might be wise to keep the temperature low. This will also lower the water consumption for the cycle since the condensed water 23 can be re-injected in the bottoming steam cycle 11. The medium used for the cooling is boiler feed water $24_1$, $24_2$ from a bottoming steam and water cycle 11. During the cooling of the syngas $17_1$, in the CO shift reactor 22, the syngas $17_1$ undergoes the following reaction:

$$CO + H_2O \Rightarrow H_2 + CO_2 + 41.15 \text{ kJ/mol}$$

The CO shift reactor 22 is in other words used to convert CO and water to $CO_2$ and more hydrogen. Also this reaction is mildly exothermic, leading to some of the water which was condensed out during the cooling (or all water if the cooling temperature is high) being evaporated again, taking heat from the exothermic process described above. After the CO shift reactor 22 the syngas $17_2$ consists ideally of $H_2$, $CO_2$ and $H_2O$. This syngas $17_2$ is then lead to some kind of $CO_2$ absorption equipment 25, based on either chemical or physical absorption. The $CO_2$ removal rate in this kind of equipment is around 90%. Low pressure steam 26 needed for the $CO_2$ removal is extracted from the steam turbine 12, and the condensed water 27 is lead back to the feed water tank of the steam cycle 11. The removed $CO_2$ 28 is further compressed by means of inter-cooling in a compressor 29, producing liquid $CO_2$ 30 that might be deposited or used in for instance enhanced oil recovery.

After removing most of the $CO_2$, the syngas $17_3$ mainly consisting of $H_2$, $H_2O$ and some remaining $CO_2$ is lead to a combustion chamber 5, to be burned together with air from the first side of the membrane/POX reactor 4. The water in the syngas $17_3$ helps control the combustion temperature and thus lowers $NO_x$ formation. A part of the resulting syngas $17_3$ comprising hydrogen 6 from the $CO_2$ removal equipment 25 can as well be burned in the catalytic burner 20.

LIST OF DESIGNATIONS

1 Air
2 Compressor
3 Compressed air
4 Membrane/partial oxidation (POX) reactor
5 Combustion chamber
6 Hydrogen
7 Gas turbine
8 Generator
9 Hot flue gases
10 Heat recovery steam generator
11 Bottoming steam cycle
12 Steam Turbine
13 Generator
14 Natural gas
15 Superheated steam
16 Medium temperature heat exchanger
$17_1$, $17_2$, $17_3$ Syngas
18 Membrane 19 Low temperature heat exchanger.
20 Catalytic burner
21 Hydrogen
22 CO shift reactor
23 Condensed water
24 Boiler feed water
25 $CO_2$ absorption equipment
26 Low pressure steam
27 Condensed water
28 $CO_2$
29 compressor
30 liquid $CO_2$

What is claimed is:

1. A method of operating a gas turbine power plant comprising:
compressing air in at least one compressor;
feeding the compressed air from the at least one compressor through a first side of a membrane/partial oxidation reactor;
feeding the air from the first side of the membrane/partial oxidation reactor to a combustion chamber;
combusting the air with hydrogen thereby producing flue gases;
expanding the flue gases in a gas turbine driving at least one generator (9);
feeding natural gas mixed with steam to a second side of the membrane/partial oxidation reactor and converting the natural gas at least to $H_2$ and CO, whereby oxygen is transferred from the compressed air through a membrane of the membrane/partial oxidation reactor and oxygen is used for partial oxidation of the natural gas;
feeding resulting syngas to a CO shift reactor thereby producing $H_2$ and converting a majority of remaining CO to $CO_2$;
feeding the resulting syngas from the CO shift reactor to $CO_2$ removal equipment thereby removing $CO_2$;
feeding the resulting syngas comprising $H_2$ and $H_2O$ from the $CO_2$ removal equipment at least to the combustion chamber.

2. The method of claim 1, further comprising:
burning in a catalytic burner a fuel with the compressed air from the at least one compressor and feeding resulting gases from the catalytic burner to the first side of the membrane/partial oxidation reactor.

3. The method of claim 2, wherein the catalytic burner is used to burn at least one selected from the group consisting of natural gas and part of the resulting syngas comprising hydrogen from the $CO_2$ removal equipment.

4. The method of claim 2, further comprising:
burning in a catalytic burner a fuel with the compressed air from the compressor and feeding resulting gases from the catalytic burner to the first side of the membrane/partial oxidation reactor during start up of the gas turbine power plant.

5. The method of claim 1, wherein produced syngas coming from the second side of the membrane/partial oxidation reactor is cooled using compressed air coming from the compressor in a heat exchanger before the syngas is fed to the CO shift reactor.

6. The method of claim 1, wherein the natural gas mixed with steam is heated using compressed air coming from the first side of the membrane/partial oxidation reactor in a heat exchanger before the natural gas mixed with steam is fed to the membrane/partial oxidation reactor.

7. The method of claim 1, wherein the $CO_2$ removed by the $CO_2$ removal equipment is compressed and liquified.

8. The method of claim 1, further comprising:
feeding the flue gases from the gas turbine to a heat recovery steam generator, thereby producing generated steam and expanding the generated steam in a steam turbine.

9. A gas turbine power plant comprising:
at least one compressor;
a membrane/partial oxidation reactor comprising a membrane, the membrane/partial oxidation reactor connected proximate a first end of a first side of the membrane to the compressor;
a combustion chamber connected to the membrane/partial oxidation reactor proximate a second end of the first side of the membrane;
a gas turbine connected to the combustion chamber;
a feed line connected to the membrane/partial oxidation reactor proximate a first end of a second side of the membrane;
a CO shift reactor connected to the membrane/partial oxidation reactor proximate a second end of the second side of the membrane by a feed line;
$CO_2$ removal equipment connected to the CO shift reactor; and
a feed line at least for hydrogen connected to the combustion chamber.

10. The gas turbine power plant of claim 9, wherein surfaces of the membrane on the second side are coated with catalytic material.

11. The gas turbine power plant of claim 10, wherein the membrane is coated with a catalyst material selected from the group consisting of Rh, Ru, Co, Fe, and bimetallic combinations thereof.

12. The gas turbine power plant of claim 9, further comprising:
before the membrane/partial oxidation reactor a heat exchanger is arranged connecting an air path after the compressor proximate the first side of the membrane and one of the feed lines proximate the second side of the membrane.

13. The gas turbine power plant of claim 9, further comprising:
after the membrane/partial oxidation reactor a heat exchanger is arranged connecting an air path after the compressor proximate the first side of the membrane and one of the feed lines proximate the second side of the membrane.

14. The gas turbine power plant of claim 9, further comprising:
before the membrane/partial oxidation reactor a heat exchanger is arranged connecting an air path before the combustion chamber proximate the first side of the membrane and one of the feed lines proximate the second side of the membrane.

15. The gas turbine power plant of claim 9, further comprising:
after the membrane/partial oxidation reactor a heat exchanger is arranged connecting an air path before the combustion chamber proximate the first side of the membrane and one of the feed lines proximate the second side of the membrane.

16. The gas turbine power plant of claim 9, further comprising:
before the membrane/partial oxidation reactor a heat exchanger is arranged connecting an air path after the compressor and before the combustion chamber proximate the first side of the membrane and one of the feed lines proximate the second side of the membrane.

17. The gas turbine power plant of claim 9, further comprising:
after the membrane/partial oxidation reactor a heat exchanger is arranged connecting an air path after the compressor and before the combustion chamber proximate the first side of the membrane and one of the feed lines proximate the second side of the membrane.

18. The gas turbine power plant of claim 9, wherein a catalytic burner is arranged before the membrane/partial oxidation reactor connected proximate the first end of the first side of the membrane and connected to the compressor.

19. A gas turbine power plant comprising:
at least one compressor;
a membrane/partial oxidation reactor comprising a membrane, the membrane/partial oxidation reactor connected proximate a first side of the membrane to the compressor;
a combustion chamber connected to the membrane/partial oxidation reactor proximate the first side of the membrane;
a gas turbine connected to the combustion chamber;
a feed line connected to the membrane/partial oxidation reactor proximate a second side of the membrane;
a CO shift reactor connected to the membrane/partial oxidation reactor proximate the second side of the membrane by a feed line;
$CO_2$ removal equipment connected to the CO shift reactor; and
a feed line at least for hydrogen connected to the combustion chamber.

20. The gas turbine power plant of claim 19, wherein a side of the membrane is coated with catalytic material.

* * * * *